(12) United States Patent
Oota et al.

(10) Patent No.: US 8,864,238 B2
(45) Date of Patent: Oct. 21, 2014

(54) SEAT PAD

(75) Inventors: Masato Oota, Fujisawa (JP); Yuuya Tanaka, Utsunomiya (JP); Toshio Suzuki, Kamakura (JP)

(73) Assignee: Bridgestone Corporation, Tokyo (JP)

( * ) Notice: Subject to any disclaimer, the term of this patent is extended or adjusted under 35 U.S.C. 154(b) by 135 days.

(21) Appl. No.: 13/254,379

(22) PCT Filed: Mar. 1, 2010

(86) PCT No.: PCT/JP2010/001373
§ 371 (c)(1),
(2), (4) Date: Oct. 4, 2011

(87) PCT Pub. No.: WO2010/100880
PCT Pub. Date: Sep. 10, 2010

(65) Prior Publication Data
US 2012/0025585 A1 Feb. 2, 2012

(30) Foreign Application Priority Data

Mar. 2, 2009 (JP) ................................. 2009-048476

(51) Int. Cl.
*A47C 7/18* (2006.01)
*A47C 7/74* (2006.01)
*B29C 44/12* (2006.01)
*B60N 2/70* (2006.01)
*B29C 33/10* (2006.01)
*B29C 44/58* (2006.01)

(52) U.S. Cl.
CPC .......... *B29C 44/1261* (2013.01); *B60N 2/7017* (2013.01); *B29C 33/10* (2013.01); *B29C 44/588* (2013.01)
USPC ................................. 297/452.42; 297/452.48

(58) Field of Classification Search
USPC ............................ 297/452.42, 452.46, 452.48
See application file for complete search history.

(56) References Cited

U.S. PATENT DOCUMENTS

| 4,542,887 | A | * | 9/1985 | Bethell et al. ................. 264/46.4 |
| 5,236,243 | A | * | 8/1993 | Reyes ......................... 297/219.1 |
| 5,630,240 | A | | 5/1997 | Matsuoka et al. |
| 5,709,828 | A | * | 1/1998 | Bemis et al. .................. 264/46.5 |
| 6,206,467 | B1 | * | 3/2001 | Mense et al. ................ 297/218.2 |
| 6,247,751 | B1 | * | 6/2001 | Faust et al. ............... 297/180.13 |

(Continued)

FOREIGN PATENT DOCUMENTS

| CN | 101090653 A | 12/2007 |
| JP | 58-185235 A | 10/1983 |

(Continued)

OTHER PUBLICATIONS

International Search Report for PCT/JP2010/001373 dated May 11, 2010.

(Continued)

*Primary Examiner* — Sarah B McPartlin
(74) *Attorney, Agent, or Firm* — Sughrue Mion, PLLC (57) ABSTRACT

Provided is a seat pad 1 having a fastener member 4 on a front surface side of a pad body 2 made of a foaming resin, which includes: a ventilation member 5, one end portion of the ventilation member being located in the vicinity of the fastener member 4, and the other end portion of the ventilation member extending on a rear surface side of the pad body 2.

15 Claims, 6 Drawing Sheets

(56) References Cited

U.S. PATENT DOCUMENTS

| | | | | |
|---|---|---|---|---|
| 6,463,635 | B2* | 10/2002 | Murasaki | 24/452 |
| 6,626,488 | B2* | 9/2003 | Pfahler | 297/180.11 |
| 6,694,576 | B1* | 2/2004 | Fujisawa et al. | 24/452 |
| 7,108,319 | B2* | 9/2006 | Hartwich et al. | 297/180.1 |
| 7,533,941 | B2* | 5/2009 | Saitou et al. | 297/452.55 |
| 7,695,062 | B2* | 4/2010 | Stowe | 297/180.1 |
| 8,172,333 | B2* | 5/2012 | Pudenz | 297/452.42 |

FOREIGN PATENT DOCUMENTS

| | | |
|---|---|---|
| JP | 7-080169 A | 3/1995 |
| JP | 08-174575 A | 7/1996 |
| JP | 2000-233414 A | 8/2000 |
| JP | 2002-210272 A | 7/2002 |
| JP | 2002-336075 A | 11/2002 |
| JP | 2004-216731 A | 8/2004 |
| JP | 2008-168446 A | 7/2008 |

OTHER PUBLICATIONS

Japanese Office Action issued Mar. 4, 2014 in Japanese Patent Application No. 2011-502637.

Chinese Office Application issued Mar. 4, 2014 in Chinese Patent Application No. 201080019130.

Office Action issued in Chinese Patent Application No. 201080019130.X, dated Jul. 25, 2013.

* cited by examiner

SEAT PAD

CROSS REFERENCE TO RELATED APPLICATIONS

This application is a National Stage of International Application No. PCT/JP2010/001373 filed Mar. 1, 2010, claiming priority based on Japanese Patent Application No. 2009-048476 filed Mar. 2, 2009, the contents of all of which are incorporated herein by reference in their entirety.

TECHNICAL FIELD

The present invention relates to a seat pad used in a seat and the like of a vehicle, and in particular, to a seat pad in which occurrence of a void (an air gap) in a pad body made of a foamed resin is prevented.

In general, a seat pad used in a seat and the like of a vehicle has a fastener member on a front surface side of a pad body made of a foamed resin in order to engage and secure surface skins. This seat pad is generally formed such that: the fastener member, a supporter member to be provided on the rear surface side of the pad body and the like are placed in a cavity provided in a mold and having a shape in which a front surface side of the pad body faces downward; and, a resin raw material such as raw solution of urethane foam is foamed and solidified in the cavity, whereby the pad body is foamed and shaped to integrated with the fastener member, the supporter member and the like.

It was found that there is a problem in the above-described mold that, since the fastener member is placed in the cavity on a lower mold side in order to attach the fastener member on the front surface side of the pad body, the resin is likely to trap gas in the vicinity of the fastener, especially, in the vicinity of an end portion of the fastener at the time of foaming and solidifying the resin raw material, and, in the case where an engagement groove is provided on the front surface side of the pad body and the fastener member is placed at the bottom of the groove, the resin is likely to contain gas in the vicinity of an intersecting point of protrusions for forming the engagement groove, whereby voids (air gaps) are likely to occur in the pad body in the vicinity of the fastener member, especially in the vicinity of the end portion of the fastener portion.

Conventionally, various countermeasures against occurrence of the voids have been attempted. For example, Patent Document 1 describes that an opening is provided in the vicinity of the intersecting point of protrusions of the cavity of the mold, and a groove for discharging the gas is formed at the lower portion thereof. Further, Patent Document 2 describes that the gas is discharged by using a nonwoven fabric placed at the upper portion in the cavity of the mold. Yet further, Patent Document 3 describes that the gas is discharged from the gas discharging tube through an insert reinforce member located at the upper and center portion in the cavity of the mold and supported by the upper mold. Yet further, Patent Document 4 describes that a flexible-polyurethane foam layer attached to a surface fastener serving as the fastener member provided to the pad body is covered with an elastomer film in order to prevent containment of the gas occurring due to entry of the resin raw material of the pad body into the flexible-polyurethane foam.

RELATED ART DOCUMENT

Patent Document

Patent Document 1: Japanese Patent Application Laid-open No. 2008-168446

Patent Document 2: Japanese Patent Application Laid-open No. 2000-233414

Patent Document 3: Japanese Patent Application Laid-open No. 08-174575

Patent Document 4: Japanese Patent Application Laid-open No. 2002-210272

DISCLOSURE OF THE INVENTION

Problems to be Solved by the Invention

However, with the countermeasure described in Patent Document 1, the gas cannot be discharged when the urethane clogs the gas discharging groove, requiring a lot of work for doing maintenance for preventing the clogging. Further, with the countermeasure described in Patent Document 2, although the gas existing in the vicinity of the upper portion of the cavity of the mold is discharged, it is still not sufficient to discharge the gas in the vicinity of the protrusion at the lower portion of the cavity of the mold. Yet further, with the countermeasure described in Patent Document 3, an extremely large insert reinforce member is required for discharging the gas in the vicinity of the protrusion at the lower portion of the cavity of the mold, and when receiving a large force arising from foaming of the resin raw material of the pad body, the extremely large insert reinforce member falls upon the seat pad, which causing the deterioration of quality of the seat pad. Yet further, with the countermeasure described in Patent Document 4, the excessive covering of the flexible-polyurethane foam with the elastomer film renders the strength against detachment of the surface fastener undesirably low, whereas the insufficient area covering renders the resin raw material excessively intrude the flexible-polyurethane foam layer, which makes it impossible to prevent the gas from being enclosed. Therefore, in any of the cases describe above, the countermeasures for the voids were not sufficient.

Means for Solving the Problem

An object of the present invention is to advantageously solve the problems described above, and the present invention provides a seat pad having a fastener member on a front surface side of a pad body made of foaming resin, which includes a ventilation member, one end portion of the ventilation member being located in the vicinity of the fastener member, and the other end portion of the ventilation member extending on a rear surface side of the pad body.

Effect of the Invention

According to the seat pad of the present invention, during a time when a resin raw material is being foamed and solidified in a cavity of a mold for expansion molding the pad body, gas moves from the one end portion of the ventilation member located in the vicinity of the fastener member in the pad body where the gas is likely to be trapped, to the other end portion of the ventilation member. Then, the gas passes from the rear surface side of the pad body through a mating surface between the upper and lower molds, a gas discharging hole and the like, and is discharged to the outside of the mold.

Therefore, according to the seat pad of the present invention, it is possible to reliably prevent occurrence of the void in the vicinity of the fastener member, especially in the vicinity of the end portion of the fastener member in the pad body without causing clogging of the gas discharging groove of the mold with the resin, a trouble caused by falling of the insert reinforce member, a trouble due to the placement of the film, and the like. In this specification, the pad body can be formed by foaming and solidifying the resin raw material such as polyurethane, polyethylene and polystyrene, and as the fastener member, it may be possible to employ, for example, a surface fastener and hanging wire. Further, as the ventilation member, it may be possible to employ a slab urethane, nonwoven fabric, felt, and resin hose, and it may be possible to support the ventilation member by any of the upper mold and the lower mold of the mold for expansion molding the pad body.

It should be noted that, according to the seat pad of the present invention, the fastener member may be formed integrally with urethane foam or nonwoven fabric so as to enhance the strength against detachment from the pad body. With this configuration, it is possible to discharge the gas, which is likely to be trapped in the urethane foam or nonwoven fabric, to the outside of the mold, whereby it is possible to reliably prevent the occurrence of the void in the pad body while enhancing the strength against detachment of the fastener member relative to the pad body.

Further, according to the seat pad of the present invention, the fastener member may be disposed at a bottom portion of an engagement groove provided on a front surface side of the pad body. With this configuration, it is possible to evacuate, to the outside of the mold, the gas that is likely to be contained in bottom portions of engagement grooves corresponding to the top end portions of the protrusions provided on the lower mold and forming the engagement grooves, the containment of the gas being caused by delay in the resin raw material arriving in the vicinity of the top portions of the protrusions, whereby it is possible to further reliably prevent the occurrence of the void in the pad body.

Yet further, according to the seat pad of the present invention, it may be possible that end portions of plural fastener members are arranged so as to be gathered in the vicinity of an intersecting portion of the engagement grooves; and, the one end portion of the ventilation member is disposed in the vicinity of the gathered end portions of the fasteners. With this configuration, the intersecting portion of the engagement grooves is displaced from the center of the seat pad, and is less likely to contact with a human body at the time of sitting on the seat, whereby a seated person does not feel any discomfort at all, or feels hardly any discomfort even in the case where the fastener member or the ventilation member is relatively hard as compared with the pad body.

Yet further, according to the seat pad of the present invention, the fastener member and the one end portion of the ventilation member may be arranged so as to be spaced at a distance in the range of 1 mm to 17 mm. With this configuration, the resin raw material can enter the space, whereby it is possible to secure the strength of adhering of the fastener member with the pad body, and the strength against detachment of the fastener member from the pad body.

Yet further, according to the seat pad of the present invention, the ventilation member and the fastener member may be arranged so as not to overlap with each other on a projection surface on which the ventilation member and the fastener member are projected toward the front surface side of the pad body. With this configuration, since the ventilation member and the fastener member do not overlap with each other, the fastener member can be strongly integrated with the pad member, whereby it is possible to effectively prevent the fastener member from detaching from the pad body.

Yet further, according to the seat pad of the present invention, the one end portion of the ventilation member may contact with or integrated with the urethane foam of the fastener member. With this configuration, the gas occurring from the urethane foam in the fastener member due to intrusion of the resin raw material can be discharged through the ventilation member to the outside of the mold, whereby it is possible to further reliably prevent the occurrence of the void in the pad body.

Yet further, according to the seat pad of the present invention, a supporter member having breathability may be provided on a rear surface of the pad body. With this configuration, the gas gathering on the rear surface side of the pad body through the ventilation member can be maintained within the supporter member, or can be discharged to the outside of the mold through the mating surface between the upper mold and the lower mold or gas discharging hole while preventing, by the supporter member, the leakage of the resin raw material to the outside of the mold, whereby it is possible to further reliably prevent the occurrence of the void in the vicinity of the engagement groove of the pad body.

As the supporter having the breathability, it may be possible to employ, for example, a woven fabric or nonwoven fabric.

BEST MODE FOR CARRYING OUT THE INVENTION

Hereinbelow, with reference to the drawings, an embodiment according to the present invention will be described in detail by way of example. FIG. 1(a) and FIG. 1(b) are respectively a plan view illustrating an example of a seat pad according to the present invention, and a sectional view of the seat pad of the example taken along the line A-A in FIG. 1(a). FIG. 2 is a sectional view of a mold for forming the seat pad of the example at a position corresponding to the line A-A in FIG. 1(a). FIG. 3 is a perspective view illustrating a part of a cavity in a lower mold of the mold. In the drawings, a reference number 1 represents a seat pad; a reference number 2 represents a pad body; a reference number 3 represents a supporter member; a reference number 4 represents a fastener member; and, a reference number 5 represents a ventilation member.

As illustrated in FIGS. 1(a) and 1(b), the seat pad 1 according to this example includes: a pad body 2; a supporter member 3 provided integrally with a rear surface (a surface facing upward in FIG. 1(b)) of the pad body 2; a tape-like (sheet-like) fastener member 4 provided integrally with a seat surface of the pad body 2 surrounded by a vertical engagement groove 2a and a horizontal engagement groove 2b extending in a ladder form on a front surface (a surface facing downward in FIG. 1(b)) of the pad body 2, the fastener member 4 extending so as to be parallel to the horizontal engagement groove 2b; and, ventilation members 5 embedded in the pad body 2 so as to be positioned in the vicinity of the end portions on both sides of the fastener member 4.

The supporter member 3 is made of a breathable nonwoven fabric having a thickness, for example, in the range of 0.2 mm to 5 mm. The fastener member 4 is formed by a surface fastener having a tape-like (sheet-like) urethane foam in an integral manner on a face opposite to an engagement face of a surface fastener body, the tape-like urethane foam being provided for improving the resistance to detachment. The ventilation members 5 are formed by a block-like slab urethane foam having, for example, a vertical slit as illustrated on the right side in FIG. 3 and, for example, dimensions of length of 30 mm, width of 30 mm and height in the range of 30 mm to 50 mm. Lower end portions of the ventilation members 5, which are end portions on the lower side of the ventilation members 5 in FIG. 1(b), contact with a rear surface of the end portions on both sides of the fastener member 4, and are exposed from a surface of the pad body 2 or are embedded in the pad body 2 so as to be located upward and be spaced at a distance, for example, in the range of 1 mm to 17 mm from the rear surface of the end portions on both sides of the fastener member 4 in FIG. 1(b). Further, each upper end portion of the ventilation members 5, which are end portions on the upper side of the ventilation members 5 in FIG. 1(b), is spaced at a distance, for example, in the range of 1 mm to 17 mm from the lower surface of the supporter member 3, or contacts with the lower surface of the supporter member 3. Each of the ventilation members 5 extends in the pad body 2 between the two end portions.

The pad body 2 is made mainly of polyhydroxy compound and polyisocyanate compound, and is formed such that a polyurethane foaming raw material obtained by adding auxiliary agents such as foaming agent, foam stabilizer and catalyzer to these compounds depending on applications is supplied into the cavity of the mold 6 as illustrated in FIG. 2 and FIG. 3, and, the supplied polyurethane foaming raw material is foamed and solidified in the cavity. The mold 6 has a lower mold 6a for mainly forming a front surface side of the pad body 2, and an upper mold 6b for mainly forming a rear surface side of the pad body 2. The mold 6 further has protrusions 6c formed on the lower mold 6a for forming a vertical and horizontal engagement grooves 2a and 2b on the front surface of the pad body 2, and pins 6d provided for positioning the fastener member 4 and each standing at a side of each of the end portions of a predetermined set position of the fastener member located in a center position surrounded by the protrusions 6c for forming the vertical and horizontal engagement grooves 2a and 2b. Further, a gas discharging hole, which is not shown, is provided at a position where the supporter member is attached on the upper mold 6b.

At the time of forming the seat pad 1 according to this example, first, the upper mold 6b and the lower mold 6a of the mold 6 are set to be in a mold opening position; the fastener member 4 is set at the predetermined set position in the center portion of the lower mold 6a as illustrated in FIG. 2 and FIG. 3; as illustrated in FIG. 2, the ventilation members 5 are set to the respective pins 6d such that each of the pins 6d is clamped by means of the slip provided to each of the ventilation members 5 as exemplarily illustrated on a right side in FIG. 3; the supporter member 3 is set to the upper mold 6b so as to cover the inner surface of the upper mold 6b as illustrated in FIG. 2; then, the polyurethane foaming raw material is supplied into the lower mold 6a, and the upper mold 6b is mold closed to the lower mold 6a to define a cavity corresponding to the seat pad 1 in the mold 6; and, the polyurethane foaming raw material is foamed and solidified in the cavity, thereby expansion molding the pad body 2 integrally with the fastener member 4 and the supporter member 3. Then, after the polyurethane foaming raw material solidifies, the upper mold 6b and the lower mold 6a of the mold 6 are mold opened to remove the seat pad 1 from the lower mold 6a, and the seat pad 1 is take off from the upper mold 6b while being expanded.

With this configuration, it is possible to form the seat pad 1 according to this example. At the time of forming the seat pad 1 according to this example, during the time when the polyurethane foam raw material is being foamed and solidified in the cavity of the mold 6, the gas trapped in the pad body 2 moves from the one end portions of the ventilation members 5 located in the vicinity of the end portions on both sides of the fastener member 4, where the gas is likely to be trapped, through the other end portions of the ventilation members 5, and is discharged from the rear surface side of the pad body 2 through the mating surface between the upper mold 6b and the lower mold 6a or the gas discharging hole to the outside of the mold.

Therefore, according to the seat pad 1 of this example, it is possible to reliably prevent the occurrence of the void in the vicinity of the end portions on both sides of the fastener member 4 in the pad body 2 without causing clogging of the gas discharging groove of the mold with the resin, a trouble caused by falling of the insert reinforce member the placement of the film, and the like.

Further, according to the seat pad 1 of this example, since the fastener member 4 is formed integrally with the urethane foam so as to enhance the strength against detachment from the pad body 2, the gas that is likely to be trapped in the urethane foam can be discharged to the outside of the mold 6, whereby it is possible to reliably prevent the occurrence of the void in the pad body 2 while enhancing the strength of the fastener member 4 against detachment from the pad body 2.

Yet further, according to the seat pad 1 of this example, in the case where the lower end portions of the ventilation members 5, which are end portions on the lower side of the ventilation members 5 in FIG. 1(b), are embedded in the pad body 2, and are located upward in FIG. 1(b) so as to be spaced, for example, in the range of 1 mm to 17 mm from the rear surface of the end portions on both sides of the fastener member 4, the resin raw material intrudes the space, whereby it is possible to ensure the strength of adhering the fastener member 4 to the pad body 2, as well as the strength against detachment from the pad body 2. In this case, it is possible to discharge the gas that is likely to be contained in the end portions of the fastener member 4, through the ventilation members 5 to the outside of the mold 6, even if the lower end portions of the ventilation members 5 are spaced from the fastener member 4. On the other hand, in the case where the lower end portions of the ventilation members 5, which are end portions on the lower side of the ventilation members 5 in FIG. 1(b), contact with the rear surface of the end portions on both sides of the fastener member 4, or are formed integrally with the tape-like urethane foam provided on the rear surface of the fastener member 4, it is possible to discharge the gas occurring from the urethane foam of the fastener member 4 due to intrusion of the resin raw material, through the ventilation members 5 to the outside of the mold 6, whereby the occurrence of the void in the pad body 2 can be further reliably prevented.

Yet further, according to the seat pad of this example, since the supporter member 3 having breathability is provided on the rear surface of the pad body 2, it is possible to maintain, within the supporter member 3, the gas gathered on the rear surface side of the pad body 2 through the ventilation members 5, or discharge the gathered gas through the mating surface between the upper mold 6b and the lower mold 6a, the gas discharging hole and the like to the outside of the mold 6 while preventing, by the supporter member 3, the leakage of the resin raw material to the outside of the mold 6, whereby the occurrence of the void in the vicinity of the end portions on both sides of the fastener member 4 in the pad body 2 can be further reliably prevented.

It should be noted that it is preferable that the ventilation member 5 is provided in the vicinity of the end portion of the fastener member 4 in the longitudinal direction, where the void is likely to occur. Further, it is preferable to provided a pair of ventilation members 5 in the vicinity of the respective end portions of the fastener member 4 in the longitudinal direction as exemplarily illustrated in FIG. 1 to suppress the effect of arrangement of the ventilation member 5 on quality of the product seat pad while effectively suppressing the occurrence of the void.

Figure 4:
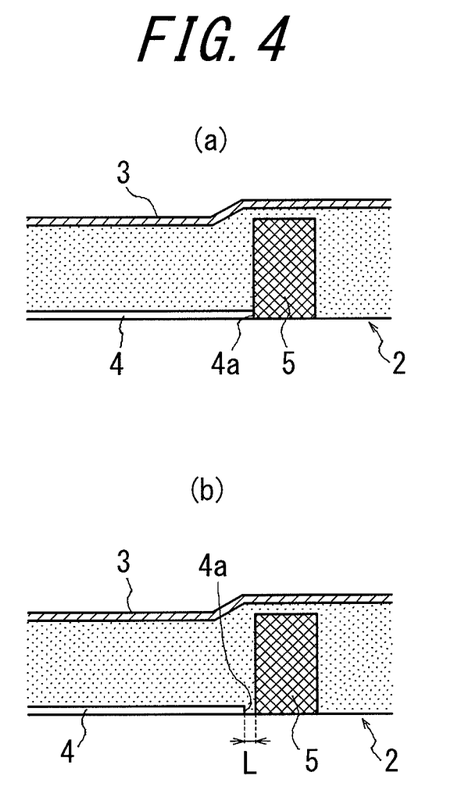
FIG. 4 is an enlarged sectional view taken along the line A-A and illustrating a modification example of arrangement of the ventilation member in the seat pad.

The ventilation members 5 and the fastener member 4 may be arranged so as not to overlap with each other on a projection surface on which the ventilation member 5 and the fastener member 4 are projected toward the front surface side of the pad body 2. In this case, it is preferable to arrange the ventilation members 5 such that the lower end portions of the ventilation members 5 are located within the thickness of the fastener member 4, and it is more preferable to expose the lower end portions of the ventilation members 5 from the pad body 2 as exemplarily illustrated in the enlarged sectional view of FIG. 4.

In the seat pad 1 illustrated in FIG. 4(a), the fastener member 4 and the ventilation member 5 do not overlap with each other, and, the ventilation member 5 are disposed so as to be exposed from the surface of the pad body 2, and to contact with an end edge 4a of the fastener member 4. In this case, since the end portion of the fastener member is disposed sufficiently near to the ventilation member 5, the gas contained in the vicinity of the end portion of the fastener member is easily discharged through the ventilation member 5 to the outside of the mold, thereby effectively suppressing the occurrence of the void. Further, since the fastener member 4 and the ventilation member 5 do not overlap with each other, the fastener member 4 is expansion molded integrally with the pad body 2 in a strong manner, whereby it is possible to effectively prevent the detachment of the fastener member 4 from the pad body 2.

In the seat pad illustrated in FIG. 4(b), the ventilation member 5 is exposed from the surface of the pad body 2, and is disposed at the right side of the end edge 4a of the fastener member 4 in the drawing so as to be spaced from the end edge 4a of the fastener member 4. It is preferable that the space distance L from the ventilation member 5 to the end edge 4a of the fastener member 4 is set to 17 mm or lower in order to effectively discharge the gas at the end portion of the fastener member 4 through the ventilation member 5 at the time of expansion molding. With such an arrangement, the resin raw material sufficiently intrudes between the end edge 4a of the fastener member 4 and the ventilation member 5, whereby it is possible to further enhance the strength against detachment of the fastener member 4 from the pad body 2.

In the case where the fastener member 4 is formed with a layered structure having plural layers in which a porous layer such as a sheet-like urethane foam, nonwoven fabric and woven fabric, a film, a hair-like layer and the like are combined with the surface fastener, which is not illustrated, the gas accumulated between the layers is pushed out from the end portion of the fastener member 4 at the time when the polyurethane foam raw material is foamed and solidified, whereby the void is likely to occur especially in the vicinity of the end portion of the fastener member 4. In such a case, it is extremely effective to dispose the ventilation member 5 in the vicinity of the end portion of the fastener member 4.

Figure 5:
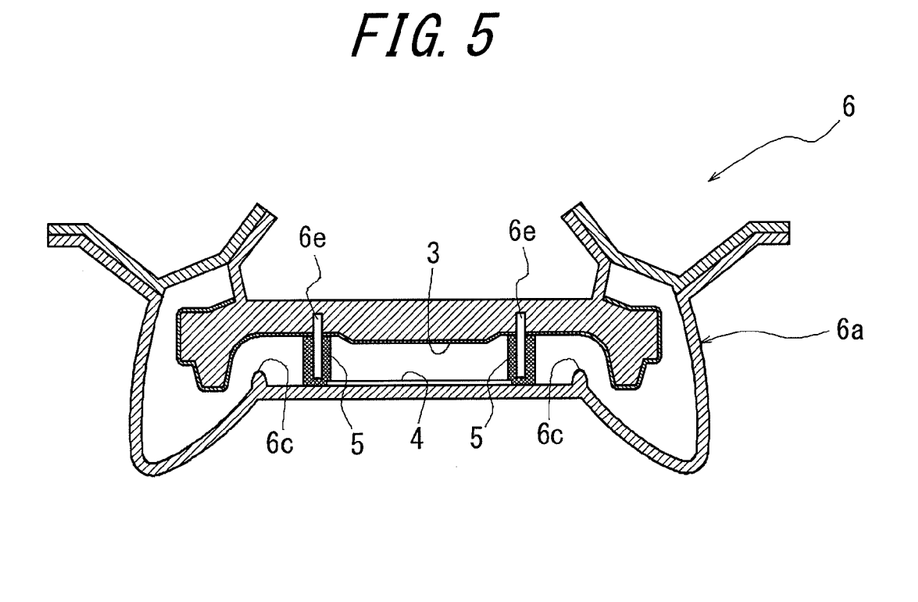
FIG. 5 is a sectional view of a mold for forming a seat pad of the other example of the present invention at a position corresponding to the line A-A in FIG. 1(a)

FIG. 5 is a sectional view of a mold for forming the other example of the seat pad of the present invention, which is taken at the position corresponding to the line A-A in FIG. 1(a). In FIG. 5, portions identical to those of the previously described example are denoted with identical reference numerals. More specifically, the seat pad 1 according to this example has the same configuration as the previously described example except that, in the seat pad according to this example, both end portions of the ventilation members 5 contact with the fastener member 4 disposed on the front surface side of the seat pad 2 and the breathable supporter member 3 disposed on the rear surface side of the seat pad 2.

Further, at the time of forming the seat pad 1 according to this example, the pad body 2 is expansion molded integrally with the surface fastener 4 and the supporter member 3 such that: the pins 6d (see FIG. 2) on the lower mold 6a of the mold 6 for positioning the surface fastener 4 are shortened; instead of setting the ventilation members 5 to the pins 6d, needles 6e penetrating the supporter member 3 and projected into the inside of the cavity are provided on the upper mold 6b of the mold 6; the needles 6e are inserted into the ventilation members 5 to support the ventilation members 5; the ventilation members 5 are set at positions corresponding to the respective end portions of the surface fastener 4 set on the lower mold 6a as illustrated in FIG. 5; the upper end portions of the ventilation members 5 contact with the supporter member 3 set on the upper mold 6b; the lower end portions of the ventilation members 5 are disposed so as to contact with the end portions on both sides of the surface fastener 4; and, the polyurethane foaming raw material is foamed and solidified in the cavity of the mold 6.

With the seat pad 1 according to this example, as is the case with the previously described example, it is possible to reliably prevent the occurrence of the void in the vicinity of the end portions on both sides of the surface fastener 4 in the pad body 2 without causing the clogging of the gas discharging groove of the mold with the resin, a trouble caused by falling of the insert reinforce member, placement of the film, and the like.

Although descriptions have been made on the basis of the examples with reference to the drawings, the present invention is not limited to the examples described above, and depending on application, may be changed within the range of description in claims. For example, it may be possible to employ a foaming raw material such as polyethylene and polystyrene for the resin raw material for expansion molding the pad body 2, rather than the polyurethane foaming raw material; employ a woven fabric for the supporter member 3, rather than the nonwoven fabric; form the fastener member integrally with a nonwoven fabric, in place of the urethane foam, for enhancing the strength against detachment of the fastener member 4 from the pad body 2; and, form the ventilation member 5 by a hair felt or nonwoven fabric as illustrated on the left in FIG. 3 or resin hose, rather than the block-like slab urethane foam. Further, it may be possible to form the needle 6e provided to the upper mold 6b in a cylindrical shape so as to penetrate the upper mold 6b, and employ the needle 6e in place of the gas discharging hole of the upper mold 6b.

Figure 6:
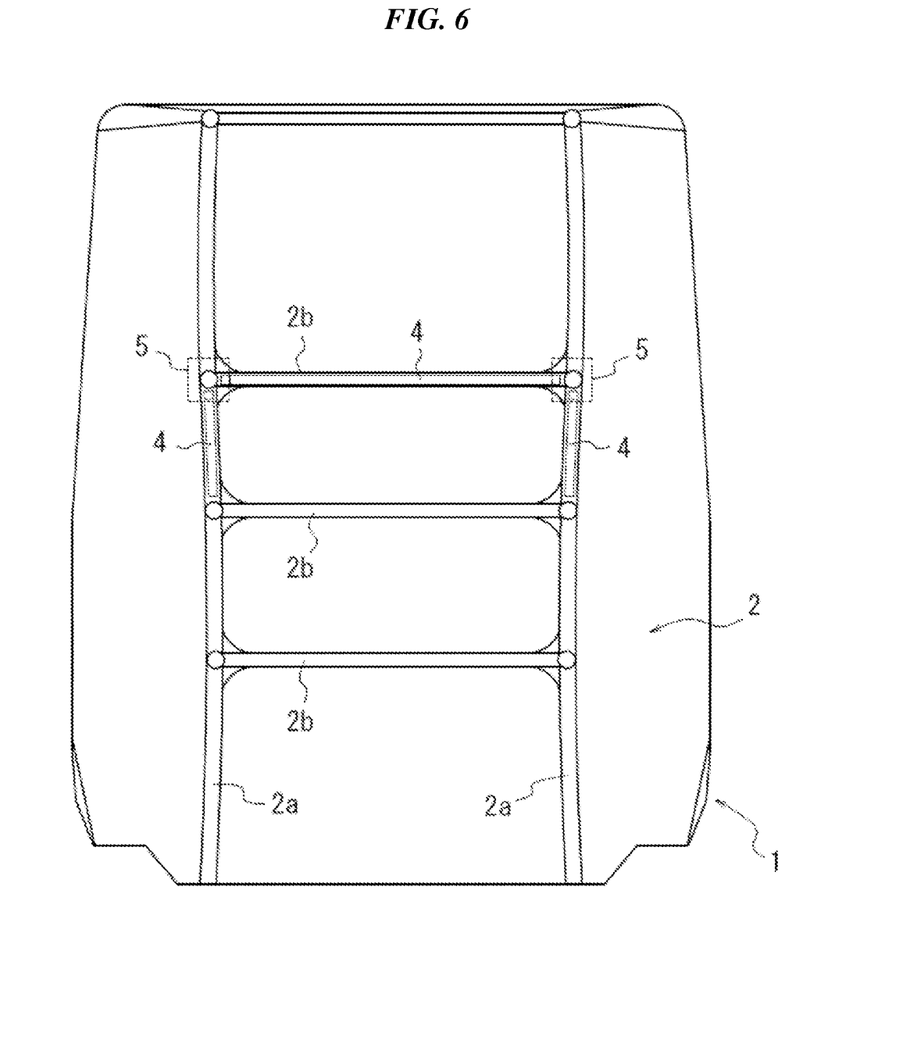
FIG. 6 is a plan view illustrating another example of a seat pad according to the present invention.

Further, it may be possible to dispose the fastener member 4 at the bottom portion of the engagement grooves 2a and 2b, in place of or in addition to in the seat surface surrounded by the engagement grooves 2a and 2b on the front surface side of the pad body 2. With this configuration, it is possible to evacuate, to the outside of the mold 6, the gas that is likely to be contained in the bottom portions of the engagement grooves 2a and 2b corresponding to the top end portions of the protrusions 6c provided on the lower mold 6a for forming the engagement grooves 2a and 2b, the containment of the gas being caused by delay in the resin raw material arriving in the vicinity of the top end portions of the protrusions 6c, whereby it is possible to further reliably prevent the occurrence of the void in the pad body 2. In this case, it may be possible to arrange the end portions of plural fastener members 4 so as to be gathered in the vicinity of the intersecting portion of the engagement grooves 2a and 2b, and dispose the one end portion of the ventilation member 5 in the vicinity of the gathered end portions of the fastener members 4, as shown in FIG. 6. With this configuration, the intersecting portion of the engagement grooves 2a and 2b is displaced from the center of the seat pad 1, and is less likely to contact with a human body at the time of sitting on the seat, whereby a seated person does not feel any discomfort at all, or feels hardly any discomfort even in the case where the fastener member 4 or the ventilation member 5 is relatively hard as compared with the pad body 2.

EXAMPLE

Next, description will be made of results of evaluation on performances of the seat pad according to the present invention.

Figure 1:
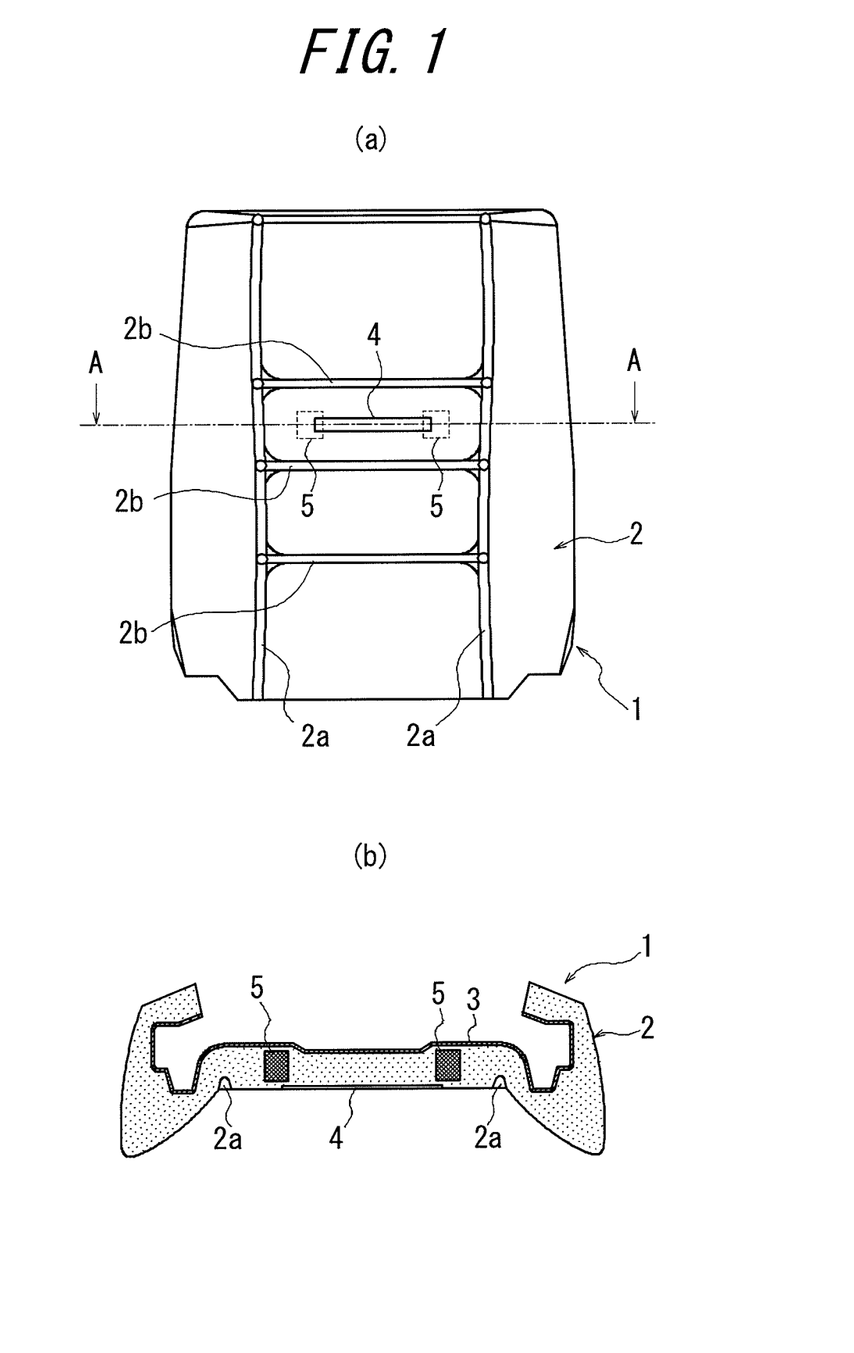
FIG. 1(a) and FIG. 1(b) are respectively a plan view illustrating an example of a seat pad according to the present invention, and a sectional view of the seat pad of the example taken along the line A-A in FIG. 1(a).
Figure 2:
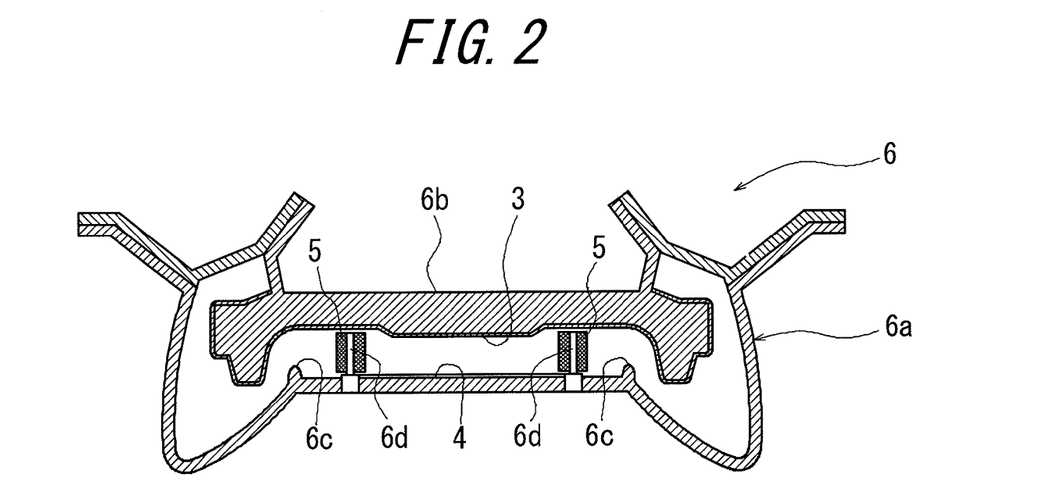
FIG. 2 is a sectional view of a mold for forming the seat pad of the above-described example at a position corresponding to the line A-A in FIG. 1(a).
Figure 3:
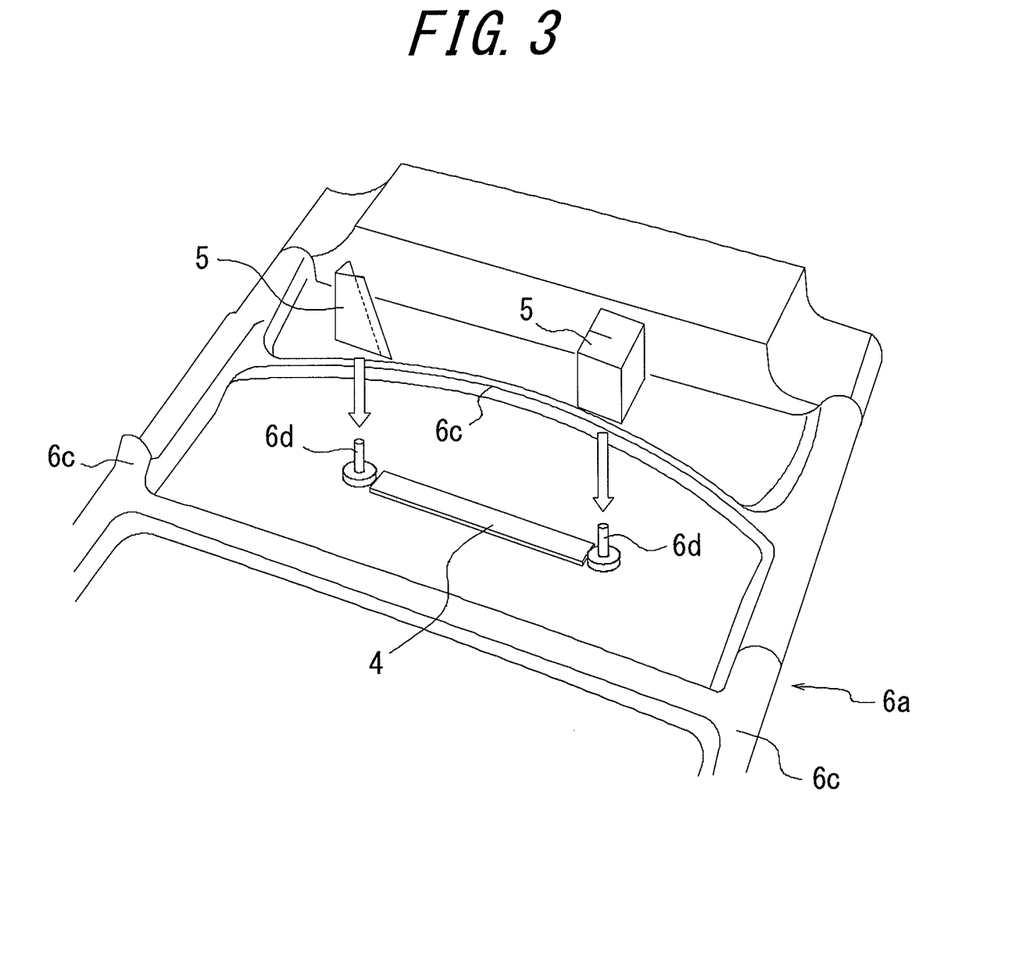
FIG. 3 is a perspective view illustrating a part of a cavity in a lower mold of the mold.

A seat pad of Example 1 was manufactured by using a mold similar to that shown in FIG. 2, and has a configuration illustrated in FIG. 1. In this seat pad according to Example 1, in FIG. 1(b), the ventilation members 5 and the fastener member 4, which is a surface fastener made of resin, are overlapped with each other on a projection surface on which the ventilation members 5 and the fastener member 4 are projected toward the front surface side of the pad body 2. Further, a length of each space between the end portions on the lower side of the ventilation members 5 and the rear surface of each of the end portions on both sides of the fastener member 4 is set to 0 mm, in other words, no space is provided between them.

Yet further, thicknesses of the seat pad 1 at positions of respective end portions of the fastener member 4 formed integrally with the front surface of the seat pad 1 are set to 70 mm.

Seat pads of Examples 2 to 7 each have the same configuration as the seat pad of Example 1 except that, in these Examples, a length in the vertical direction in the drawing of each space between the end portions on the lower side of the ventilation members 5 and the rear surface of each of the end portions on both sides of the fastener member 4 varies as illustrated in Table 1, and, the end portions on the lower side of the ventilation members 5 are disposed so as to be embedded in the pad body 2.

A seat pad of Example 8 has the same configuration as the seat pad of Example 1 except that, in Example 8, as illustrated in FIG. 4(a), the fastener member 4 and the ventilation members 5 do not overlap with each other on a projection surface on which the fastener member 4 and the ventilation members 5 are projected toward the front surface of the pad body 2, and the ventilation members 5 are disposed so as to be exposed from the surface of the pad body 2, and to contact with the end edge 4a of the fastener member 4.

The seat pad of Example 9 has the same configuration as the seat pad of Example 8 except that, in Example 8, as illustrated in FIG. 4(b), the space distance L of the ventilation member 5 from the end edge 4a of the fastener member 4 is set to 15 mm. Further, the seat pad of Example 9 has the same configuration as the seat pad of Example 10 except that this space distance L is set to 17 mm.

For the seat pads of Examples described above, evaluation has been made on the effect of the gas discharging by the ventilation member 5, by visually inspecting the presence or absence of the void resulting from the gas contained in the vicinity of the end portion of the fastener member 4 at the time of expansion molding the seat pad. The results thereof are shown in Table 1. Note that, in Table 1, the mark O1 represents that the void does not occur; the mark O2 represents that the void cannot be recognized at first glance but the small amount of the void can be recognized when carefully watching the sample; and, the mark X represents that occurrence of the void can be recognized even at a glance.

Further, in order to evaluate the strength against detachment of the fastener member 4 from the pad body 2, a detaching force of 20 N with respect to the pad body 2 is applied to the fastener member 4 while the end portion of the fastener member 4 is being gripped. The results thereof are shown in Table 1. Note that, in Table 1, the mark O1 represents that there is no detaching portion; O2 represents that, although the detachment does not grow and the degree of detachment is not a problem, slight detachment occurs in an area where the end portion of the fastener member 4 contacts with the ventilation member 5.

TABLE 1

| | | | Evaluation results | |
|---|---|---|---|---|
| | Length of space (mm) | Space distance L (mm) | Gas discharging effect | Strength against detachment |
| Example 1 | 0 | — | O1 | O2 |
| Example 2 | 1 | — | O1 | O1 |
| Example 3 | 5 | — | O1 | O1 |
| Example 4 | 10 | — | O1 | O1 |
| Example 5 | 15 | — | O1 | O1 |
| Example 6 | 17 | — | O2 | O1 |
| Example 7 | 20 | — | X | O1 |
| Example 8 | — | 0 | O1 | O1 |
| Example 9 | — | 15 | O1 | O1 |
| Example 10 | — | 17 | O2 | O1 |

From the results of the seat pads of Examples 1 to 7 in Table 1, it can be known that the smaller length of the space between the end portions on the lower side of the ventilation members 5 and the rear surface of the end portions on both sides of the fastener member 4 exhibits the better gas discharging effect. In particular, it can be known that, in the case where this length is set to 17 mm or lower, the gas in the vicinity of the end portions of the fastener member 4 is sufficiently discharged through the ventilation members 5 at the time of expansion molding, whereby it is possible to suppress the occurrence of the void in the seat pad 1. Further, in particular, in the case where this length is set to 15 mm or lower, it is possible to further suppress the occurrence of the void in the seat pad 1.

Further, although detachment cannot be found in the samples except for the contact portion between the fastener member 4 and the ventilation member 5 and the degree of detachment is not a problem, it is preferable to set a space of 1 mm or more from the viewpoint of eliminating the detachment.

From these results, it is found that the length of each of the spaces between the end portions on the lower side of the ventilation members 5 and the rear surface of the end portions on both sides of the fastener member 4 is preferably set in the range of 0 mm to 17 mm from the viewpoint of the discharge of the gas and the strength against the detachment, more preferably, in the range of 1 mm to 17 mm, and yet more preferably, in the range of 1 mm to 15 mm.

From the results of the seat pads of Examples 8 to 10 in Table 1, it can be known that, in the case where the ventilation members 5 and the fastener member 4 do not overlap with each other and the end portions on the lower side of the ventilation members 5 are disposed so as to be exposed from the pad body 2, it is possible to obtain sufficient strength against detachment of the fastener member 4 from the pad body 2, and in terms of discharge of the gas, the occurrence of the void in the seat pad 1 can be suppressed when the length L is set to 17 mm or lower.

INDUSTRIAL APPLICABILITY

As described above, according to the seat pad of the present invention, it is possible to reliably prevent the occurrence of the void in the vicinity of the fastener member of the pad body, without causing the clogging of the gas discharging groove of the mold with the resin, a trouble caused by falling of the insert reinforce member, a trouble occurring at the time of setting the film, and the like.

EXPLANATION OF REFERENCE CHARACTERS

1 Seat pad
2 Pad body
2a Vertical engagement groove
2b Horizontal engagement groove
3 Supporter member
4 Fastener member
4a End edge of fastener member
5 Ventilation member
6 Mold
6a Lower mold
6b Upper mold
6c Protrusion
6d Pin
6e Needle

The invention claimed is:

1. A seat pad having a fastener member on a front surface side of a pad body made of foaming resin, comprising:
a ventilation member, one end portion of the ventilation member being located in the vicinity of the fastener member, and the other end portion of the ventilation member extending toward a rear surface side of the pad body, wherein
the fastener member is disposed at a bottom portion of a plurality of engagement grooves provided on a front surface side of the pad body;
end portions of a plurality of fastener members are arranged to be gathered in the vicinity of an intersecting portion of the plurality of engagement grooves;
the one end portion of the ventilation member is disposed in the vicinity of the gathered end portions of the fastener members; and
a length of the ventilation member in a thickness direction of the seat pad is greater than a length of the fastener member in the thickness direction of the seat pad.

2. The seat pad according to claim 1, wherein
the fastener member is formed integrally with a urethane foam or nonwoven fabric to enhance the strength against detachment from the pad body.

3. The seat pad according to claim 2, wherein
the one end portion of the ventilation member contacts with or integrated with the urethane foam of the fastener member.

4. The seat pad according to claim 1, wherein
a supporter member having breathability is provided on a rear surface of the pad body.

5. The seat pad according to claim 1, wherein only foaming resin is provided between the ventilation member and the fastener member.

6. A seat pad having a fastener member on a front surface side of a pad body made of foaming resin, comprising:
a ventilation member, one end portion of the ventilation member being located in the vicinity of the fastener member, and the other end portion of the ventilation member extending toward a rear surface side of the pad body, wherein
the fastener member and the one end portion of the ventilation member are arranged to be spaced from each other at a distance in the range of 1 mm to 17 mm, the one end portion of the ventilation member being embedded in the pad body, and
a length of the ventilation member in a thickness direction of the seat pad is greater than a length of the fastener member in the thickness direction of the seat pad.

7. The seat pad according to claim 6, wherein
the fastener member is formed integrally with a urethane foam or nonwoven fabric to enhance the strength against detachment from the pad body.

8. The seat pad according to claim 7, wherein
the one end portion of the ventilation member contacts with or integrated with the urethane foam of the fastener member.

9. The seat pad according to claim 6, wherein
a supporter member having breathability is provided on a rear surface of the pad body.

10. The seat pad according to claim 6, wherein only foaming resin is provided between the ventilation member and the fastener member.

11. A seat pad having a fastener member on a front surface side of a pad body made of foaming resin, comprising:
a ventilation member, one end portion of the ventilation member being located in the vicinity of the fastener member, and the other end portion of the ventilation member extending toward a rear surface side of the pad body, wherein
the ventilation member and the fastener member are arranged not to overlap with each other on a projection surface on which the ventilation member and the fastener member are projected toward the front surface side of the pad body, and
a length of the ventilation member in a thickness direction of the seat pad is greater than a length of the fastener member in the thickness direction of the seat pad.

12. The seat pad according to claim 11, wherein
the fastener member is formed integrally with a urethane foam or nonwoven fabric to enhance the strength against detachment from the pad body.

13. The seat pad according to claim 12, wherein
the one end portion of the ventilation member contacts with or integrated with the urethane foam of the fastener member.

14. The seat pad according to claim 11, wherein
a supporter member having breathability is provided on a rear surface of the pad body.

15. The seat pad according to claim 11, wherein only foaming resin is provided between the ventilation member and the fastener member.

\* \* \* \* \*